United States Patent
Abdelaziz

(10) Patent No.: US 11,719,553 B2
(45) Date of Patent: *Aug. 8, 2023

(54) SPOTFINDER

(71) Applicant: Google LLC, Mountain View, CA (US)

(72) Inventor: Omar Abdelaziz, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,365

(22) Filed: Sep. 1, 2022

(65) Prior Publication Data

US 2022/0412767 A1    Dec. 29, 2022

Related U.S. Application Data

(63) Continuation of application No. 17/286,933, filed as application No. PCT/US2019/031330 on May 8, 2019, now Pat. No. 11,460,316.

(51) Int. Cl.
  *G01C 21/36* (2006.01)
  *G01C 21/34* (2006.01)
  *G08G 1/14* (2006.01)

(52) U.S. Cl.
  CPC ..... *G01C 21/3685* (2013.01); *G01C 21/3492* (2013.01); *G08G 1/144* (2013.01); *G08G 1/146* (2013.01)

(58) Field of Classification Search
  CPC ............ G01C 21/3685; G01C 21/3492; G08G 1/144; G08G 1/146
  See application file for complete search history.

(56) References Cited

U.S. PATENT DOCUMENTS

| 7,825,827 B2 | 11/2010 | Jang et al. |
| 8,368,558 B2 | 2/2013 | Nagase |
| 8,484,151 B1 | 7/2013 | Lookingbill |

(Continued)

FOREIGN PATENT DOCUMENTS

| EP | 1471329 A2 | 10/2004 |
| EP | 2075538 A2 | 7/2009 |

(Continued)

OTHER PUBLICATIONS

First Examination Report for Indian Patent Application No. 202127009398 dated Jan. 25, 2022. 6 pages.

(Continued)

*Primary Examiner* — Hongmin Fan
(74) *Attorney, Agent, or Firm* — Lerner David LLP

(57) ABSTRACT

A system (100) and method for finding a likely available parking spot within a geographical area are disclosed. The system (100) may be configured to receive a request for directions for a first vehicle (702) to an open parking spot within a particular geographical area (210, 214), receive sensor information indicating potential open parking spots (346, 348), identify likely available parking spots (346, 348), and receive information regarding other vehicles searching for parking in the same geographical area. The system may use the identified likely available spots and the information regarding other vehicles searching for parking when computing a route (218, 220) to a likely available parking spot.

20 Claims, 12 Drawing Sheets

(56) References Cited

U.S. PATENT DOCUMENTS

| | | | |
|---|---|---|---|
| 8,779,940 B2* | 7/2014 | Amir | H04W 4/44 |
| | | | 701/465 |
| 9,734,710 B2 | 8/2017 | Kang | |
| 2008/0048885 A1 | 2/2008 | Quinn | |
| 2012/0056758 A1 | 3/2012 | Kuhlman et al. | |
| 2012/0161985 A1 | 6/2012 | Amir | |
| 2012/0200430 A1 | 8/2012 | Spahl | |
| 2014/0214319 A1 | 7/2014 | Vucetic et al. | |
| 2015/0369613 A1 | 12/2015 | Stadler | |
| 2016/0061618 A1 | 3/2016 | Benenson et al. | |
| 2018/0218604 A1 | 8/2018 | Astigarraga et al. | |
| 2018/0308358 A1* | 10/2018 | Hayakawa | B62D 15/0285 |
| 2018/0308359 A1 | 10/2018 | Hayakawa | |
| 2019/0066505 A1 | 2/2019 | Salvucci et al. | |
| 2020/0132502 A1 | 4/2020 | Beaurepaire et al. | |
| 2020/0242934 A1 | 7/2020 | Xu et al. | |

FOREIGN PATENT DOCUMENTS

| | | |
|---|---|---|
| EP | 3123459 A1 | 2/2017 |
| JP | 2004325357 A | 11/2004 |
| JP | 2005257622 A | 9/2005 |
| JP | 2009162567 A | 7/2009 |
| JP | 2009300179 A | 12/2009 |
| JP | 2010117220 A | 5/2010 |
| JP | 2016188788 A | 11/2016 |
| KR | 100853191 B1 | 8/2008 |
| KR | 101539331 B1 | 7/2015 |
| WO | 2010081545 A1 | 7/2010 |

OTHER PUBLICATIONS

Office Action for Korean Patent Application No. 10-2021-7011694 dated Feb. 8, 2022. 11 pages.
Office Action for Japanese Patent Application No. 2021-521404 dated Aug. 15, 2022. 5 pages.
Office Action for Korean Patent Application No. 10-2021-7011694 dated Aug. 26, 2022. 4 pages.
International Search Report and Written Opinion for International Application No. PCT/US2019/031330 dated Mar. 2, 2020. 13 pages.
International Preliminary Report on Patentability for International Application No. PCT/US2019/031330 dated Nov. 18, 2021. 7 pages.
Office Action for Japanese Patent Application No. 2021-521404 dated Jan. 11, 2022. 7 pages.
Notice of Allowance for Korean Patent Application No. 10-2021-7011694 dated Feb. 13, 2023. 2 pages.
Notice of Allowance for Japanese Patent Application No. 2021-521404 dated Feb. 13, 2023. 3 pages.

* cited by examiner

SPOTFINDER

CROSS-REFERENCE TO RELATED APPLICATIONS

The present application is a continuation of U.S. patent application Ser. No. 17/286,933, filed on Apr. 20, 2021, which is a national phase entry under 35 U.S.C. § 371 of International Application No. PCT/US2019/031330, filed on May 8, 2019, published in English, all of which is incorporated herein by reference.

BACKGROUND

Users may use navigational systems to find a route from their current location to an intended destination. The user may provide one or more inputs regarding their route preference. For example, a user may wish to avoid toll roads or highways. In some instances a user may want to receive the fastest route to the intended destination, and in other instances the user may want to receive the shortest route to the destination. Some navigational systems are capable of utilizing current traffic when determining a potential route to that location.

Upon arriving at the destination, parking can often be difficult, particularly on-street parking in cities or crowded geographic areas. Having difficulty finding parking causes vehicles to spend more time on the road network as motorists drive in circles around their intended destination looking for parking. This additional time on the road network adds to fuel/energy consumption in the vehicles, may increase congestion and pollution in and around the road network, and wastes time for the drivers and any passengers in the vehicles.

BRIEF SUMMARY

One aspect of the disclosed technology provides a system for providing directions to one of the identified likely available parking spots. The system comprises memory and one or more processors coupled to the memory. The one or more processors may be configured to receive a request for directions to an open parking spot for a first vehicle within a particular geographical area. The one or more processors may be further configured to receive sensor information indicating potential open parking spots, identify one or more likely available parking spots, and receive information regarding other vehicles searching for parking with the particular geographical area. The one or more processors may also be configured to compute, based on at least the identified likely available parking spots and the information regarding other vehicles, a route to one of the identified likely available parking spots.

In this aspect of the technology, the one or more processors may be further configured to receive information pertaining to current traffic, turn costs, historical parking availability, whether a street has a parking lane, and/or parking restrictions. Turns costs may be defined by a time required to make a turn.

The computed route may be a most efficient route based on a distance to a destination, a computed time to the destination or a time to find one of the identified likely available spots.

The one or more processors may be further configured to compute a second route to a second one of the identified likely available parking spots for a second vehicle within the particular geographical area, the second open parking spot being different than the first open parking spot. The particular geographical area may be defined by a radius from a destination specified by the first vehicle.

The available of the identified one or more likely available parking sports may be updated automatically by the one or more processors based on the behavior of the first vehicle or the other vehicles. The behavior of the vehicles may comprise driving past the one or more likely available parking spots without parking.

In another aspect, the technology is a method for providing directions to a first vehicle to one of the identified likely available parking spots. The method compromises receiving, by one or more processors, a request for directions to an open parking spot for a first vehicle within a particular geographical area; receiving, by the one or more processors, sensor information indicating potential open parking spots, identifying, based on the received sensor information, one or more likely available parking spots; receiving, by the one or more processors, information regarding other vehicles searching for parking within the particular geographical area; and computing a route to one of the identified likely available parking spots.

In yet another aspect of the technology, a non-transitory computer-readable medium storing instructions executable by a processor for performing a method of providing directions to a first vehicle to one of the identified likely available parking spots, the method including receiving a request for directions to an open spot for the first vehicle within a particular geographical area, receiving sensor information indicating potential open parking spots, identifying one or more likely available parking spots, receiving information regarding other vehicles searching for parking within the particular geographical area, and computing a route to one of the identified likely available parking spots.

DETAILED DESCRIPTION

Overview

Figure 1A:
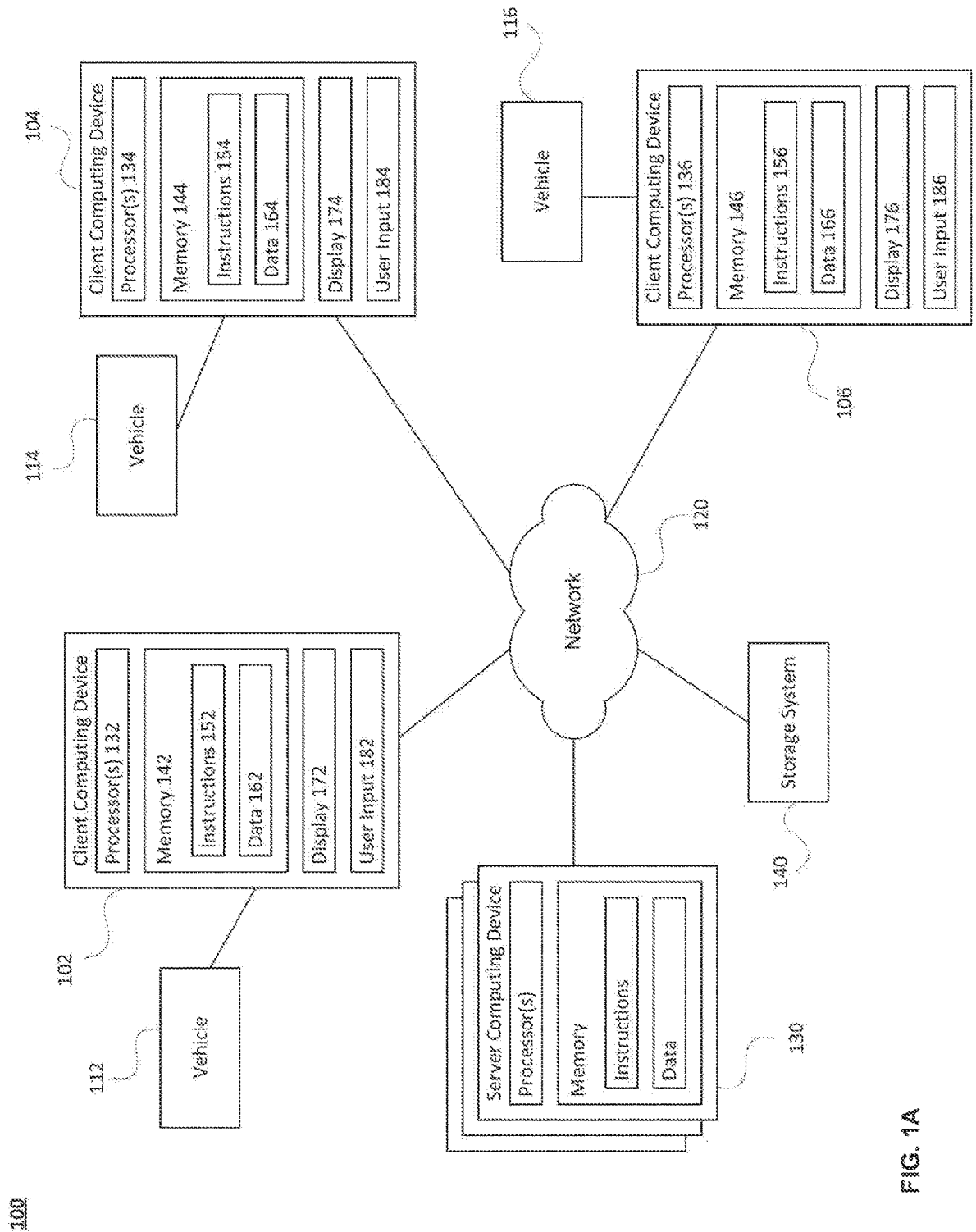
FIGS. 1A and 1B are functional diagrams of an example system in accordance with aspects of the disclosure.

The technology relates generally to a navigational system that uses sensor information to identify parking spots for users in vehicles searching for street parking. One or more parking spots are identified as likely to be available based on the sensor information and the system guides the users in the vehicles to an identified likely available parking spot along a most efficient route. For example, in identifying a specific parking bay or other parking space which is likely to be available, and providing an efficient route along which the vehicle will travel to arrive at the bay, the system may reduce the amount of time the vehicle spends on the road network whilst parking. The system may additionally (or alternatively) reduce the distance the vehicle travels whilst parking. Both of these reductions may in turn reduce the amount of fuel or electrical drive power used by the vehicle whilst parking in a particular geographical area. Additionally, local congestion levels on the road network may be significantly reduced, particularly when the system is used to navigate multiple vehicles in the same geographical area simultaneously or over approximately the same period of time. In use, the system may identify a specific geographical area and evaluate potential routes a user in a vehicle may take when attempting to find street parking in that geographical area. The system may also take into account a variety of other factors, including but not limited to: (1) real-time information, including requests from users in vehicles who are concurrently using the same system and looking for parking in the same geographical area; (2) historical parking availability; (3) information relayed from sensors on cars and/or other vehicles in the area regarding the availability of parking spots; (4) traffic and turn costs in navigating the route; (5) whether a street has a parking lane; and/or (6) parking restrictions.

When determining potential routes, the system may take into account real-time information. For example, the system may consider the current traffic between the starting destination of the vehicle/user and the user's intended destination. Further, the system may consider whether other users, who may be in other vehicles, are using the system concurrently to find an open parking spot in the same geographical area. The geographical area may be defined by a radius stemming from the user's ultimate destination, which may be user-selected, e.g., via a software application. Thus, when more than one user is looking for on-street parking at or near the same intended destination during the same time period, the system may provide a different route, each of which may have a different final destination parking spot, for each user such that the multiple users and their individual vehicles are not directed to the same parking spot.

In some instances, when determining potential routes, the system may take into account historical parking availability. For example, the system may include a database that stores historical parking availability. Historical parking availability may include, for example, information about what time spots have been typically been known to be available on specific days.

Further, the system may include one or more processors configured to receive information collected by sensors or a perception system on vehicles driving. For example, cars and/or other vehicles may include sensors on their exterior that are able to detect whether a parking spot is occupied or if it is available. The sensors may include ultrasonic sensors, infrared sensors, electromagnetic sensors, cameras, or any of a variety of other types of sensors which may identify, for example, the presence and/or absence of a vehicle in a parking spot. This information may be obtained, for example, for a large number of potential (e.g. known) parking spots by sensing each potential spot and identifying whether or not the spot is currently empty as the vehicle moves around the road network. The information collected by the sensors may, for example, be transmitted to a server at a central location. The server may then process the information and update the system in real time, so that the information is shared with all vehicles/users using the system to park. The vehicle(s) which obtain information regarding available spots need not themselves be being used to search for parking. They may instead be any vehicle which is configured to obtain the information and share it with the system.

Moreover, when determining potential routes, the system may take into account the time it will take to execute that route due to, for example, traffic or the time it takes to make turns. Therefore, each route, when taking into account the time it takes to execute, may have a different probability that the user will find an open parking spot. If the execution time (e.g. duration of travel time) for moving to a particular spot along a particular route is relatively longer, the probability assigned to the route may be correspondingly lower. On the other hand the execution time is relatively shorter, the route probability may be correspondingly higher. The system may also take into account information pertaining to whether a particular street has a parking lane and/or relevant parking restrictions that would hinder a user's ability to park in that location. For example, by knowing whether or not a street has a parking lane, the system may automatically include or exclude that street when determining potential routes. Further, by including details about the user's parking requirements, such as whether they wish to park overnight, the system will be able to include or exclude spots, based on the requirements, by taking into account general availability and accessibility information for the spots in question.

The system may score each potential route based on maximizing efficiency of searching for a parking spot and the likelihood of an available parking spot. The route with the best score may be sent to the user. Finding a spot becomes even more efficient, for example in the manners mentioned above, as more factors are included when calculating a route for the user and their vehicle. Moreover, this system may be used not only for finding street parking but it may also be used for finding parking in a parking lot or a parking garage using the same factors.

Example Systems

FIG. 1A illustrates an example system 100 in which the features described above may be implemented. It should not be considered limiting the scope of the disclosure or usefulness of the features described herein. In this example, system 100 may include a plurality of computing devices 102, 104, 106, vehicles 112, 114, and 116, server computing device 130, storage system 140, and network 120.

Each of computing devices 102, 104, 106 may include one or more processors 132, 134, 136, memory 142, 144, 146, data 162, 164, 166 and instructions 152, 154, 156. Each of computing devices 102, 104, 106 may also a display 172, 174, 176 and user input 182, 184, 186.

Memory 142, 144, 146 of computing devices 102, 104, 106 may store information that is accessible by processor 132, 134, 136. Memory 142, 144, 146 may also include data that can be retrieved, manipulated or stored by the processor 132, 134, 136. The memory 142, 144, 146 may be of any non-transitory type capable of storing information accessible by the processor 132, 134, 136, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 142, 144, 146 may store information that is accessible by the processors 132, 134, 136, including instructions 152, 154, 156 that may be executed by processors 132, 134, 136, and data 162, 164, 166.

Data 162, 164, 166 may be retrieved, stored or modified by processors 132, 134, 136 in accordance with instructions 152, 154, 156. For instance, although the present disclosure is not limited by a particular data structure, the data 162, 164, 166 may be stored in computer registers, in a relational database as a table having a plurality of different fields and records, XML documents, or flat files. The data 162, 164, 166 may also be formatted in a computer-readable format such as, but not limited to, binary values, ASCII or Unicode. By further way of example only, the data 162, 164, 166 may comprise information sufficient to identify the relevant information, such as numbers, descriptive text, proprietary codes, pointers, references to data stored in other memories (including other network locations) or information that is used by a function to calculate the relevant data.

The instructions 152, 154, 156 can be any set of instructions to be executed directly, such as machine code, or indirectly, such as scripts, by the processor 132, 134, 136. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 132, 134, 136 may include any conventional processors, such as a commercially available CPU or microprocessor. Alternatively, the processor can be a dedicated component such as an ASIC or other hardware-based processor. Although not necessary, computing devices 102, 104, 106 may include specialized hardware components to perform specific computing functions faster or more efficiently.

Although FIG. 1A functionally illustrates the processor, memory, and other elements of computing devices 102, 104, 106 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the computing devices 102, 104, 106. Accordingly, references to a processor or computing device will be understood to include references to a collection of processors or computing devices or memories that may or may not operate in parallel.

Display 172, 174, 176 and other displays described herein may be any type of display, such as a monitor having a screen, a touch-screen, a projector, or a television. The display 172, 174, 176 of the one or more computing devices 102, 104, 106 may electronically display information to a user via a graphical user interface ("GUI") or other types of user interfaces. For example, as will be discussed below, display 172, 174, 176 may electronically display a map interface with turn-by-turn directions between two geographic locations, corresponding road segments, and waypoints to maximize the overall probability of finding an open parking spot when searching in a predefined area surrounding the final geographic location.

The user inputs 182, 184, 186 may be a mouse, keyboard, touch-screen, microphone, or any other type of input.

The computing devices 102, 104, 106 can be at various nodes of a network 120 and capable of directly and indirectly communicating with other nodes of network 120. Although three (3) computing devices are depicted in FIG. 1, it should be appreciated that a typical system can include one or more computing devices, with each computing device being at a different node of network 120. The network 120 and intervening nodes described herein can be interconnected using various protocols and systems, such that the network can be part of the Internet, World Wide Web, specific intranets, wide area networks, or local networks. The network 120 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 100 may include one or more server computing devices having a plurality of computing devices, e.g., a load balanced server farm, that exchange information with different nodes of a network for the purpose of receiving, processing and transmitting the data to and from other computing devices. For instance, one or more server computing devices 130 may be a web server that is capable of communicating with the one or more client computing devices 102, 104, 106 via the network 120. In addition, server computing device 130 may use network 120 to transmit and present information to a user of one of the other computing devices 102, 104, 106 or a passenger of a vehicle. In this regard, vehicles 112, 114, 116 may be considered client computing devices. Server computing device 130 may include one or more processors, memory, instructions, and data. These components operate in the same or similar fashion as those described above with respect to computing devices 102, 104, 106.

Figure 1B:
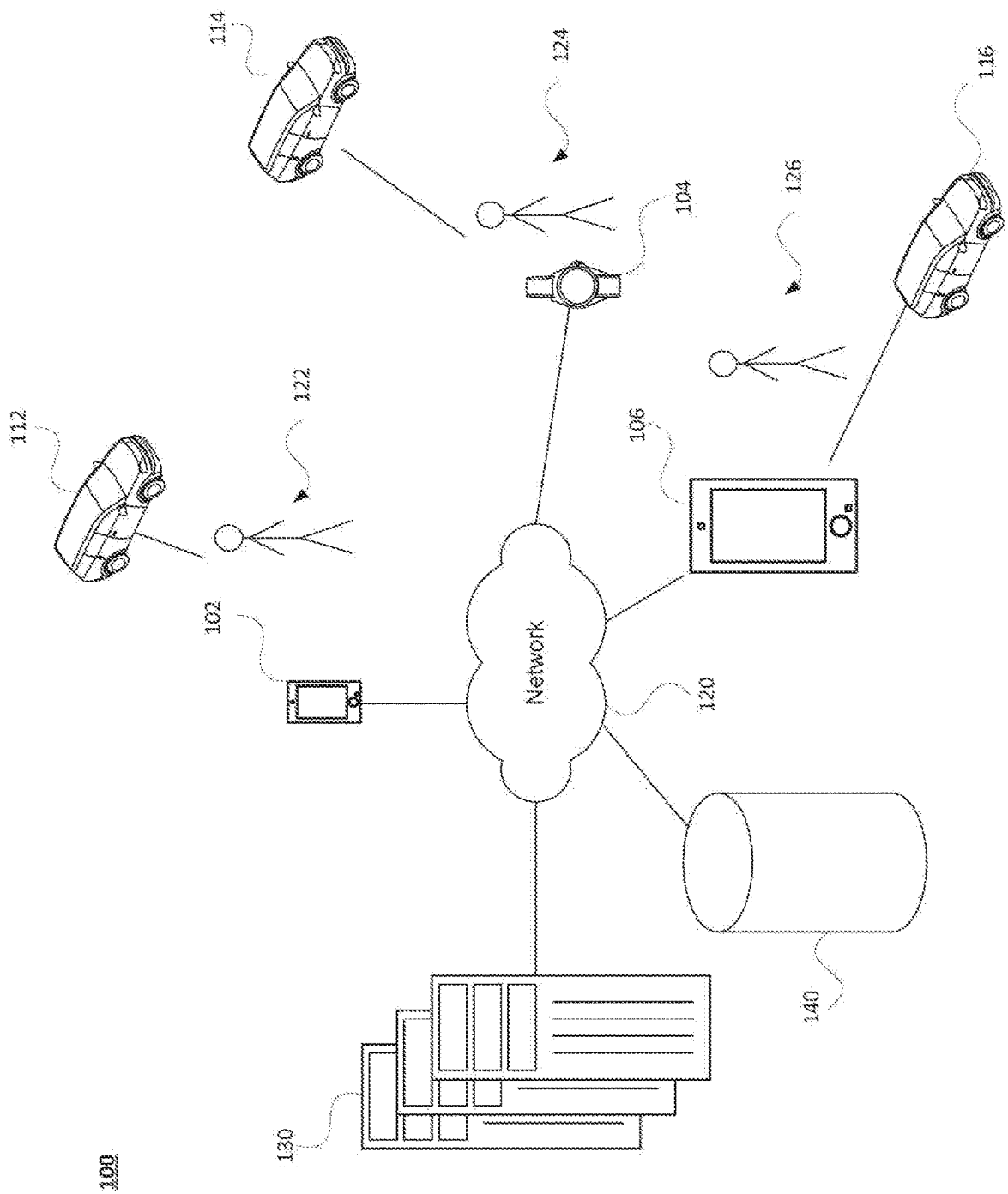

As shown in FIG. 1B, each computing device 102, 104, 106 may be a personal computing device intended for use by a respective user 122, 124, 126, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. Computing devices 102, 104, 106 may be capable of wirelessly exchanging and/or obtaining data over the network 120.

Although the client computing devices may each comprise a full-sized personal computing device, they may alternatively comprise mobile computing devices capable of wirelessly exchanging data with a server over a network such as the Internet. By way of example only, client computing devices 102, 104, and 106 may be mobile phones or devices such as a wireless-enabled PDA, a tablet PC, a wearable computing device (e.g., a smartwatch), or a netbook that is capable of obtaining information via the Internet or other networks.

Users 122, 124, 124 may operate a respective vehicle 112, 114, 116 in using the system to find parking for said vehicle 112, 114, 116. Vehicles 112, 114, 116 may include a perception system (not shown). The perception system may include one or more components for detecting and performing analysis on objects external to the vehicle such as other vehicles, obstacles in the roadway, traffic signals, signs, trees, etc. For example, the perception system may include lasers, sonar, radar, one or more cameras, or any other detection devices which record data which may be processed by a computing device (not shown) within vehicles 112, 114, 116. In the case where the vehicle is a small passenger vehicle such as a car, the car may include a laser mounted on the roof or other convenient locations as well as other sensors such as cameras, radars, sonars, and additional lasers (not shown).

While the vehicle is in motion, the perception system may determine that one or more parking spots are available and/or taken using their one or more sensors. The perception system may send this information to server computing device 130 to update system 100 with what parking spots are or are not available. In some instances, the system 100 may update in real time based on the information collected by the perception system. For example, the system may update the availability of parking spots based on the behavior of the vehicles. The behavior of the vehicle may be driving past parking spaces without parking. In other instances, the system 100 may update on a set schedule, such that the information collected by the perception system becomes part of the historical parking availability database Storage system 140 may store various types of information. For instance, the storage system 140 may store historical parking availability, location of parking lanes, parking rules and restrictions, etc. For example, historical parking availability may include information collected by the perception system, as described above. In some instances, system 100 may collect data based on the location a user parked and what time they parked. Alternatively, system 100 may collect data based upon the system detecting that the vehicle did not park in a certain location. The information collected by system 100 may become part of the historical parking availability.

The storage system 140 may store map data. This map data may include, for instance, locations of driving lanes, parking lanes, designated parking areas, no parking zones, drop off locations, etc. Map data may also include locations, road names, road configurations, etc. In some instances, the storage system 140 may store parking rules and regulations, such as alternative side of the street parking, permit parking, overnight parking restrictions, etc.

The storage system 140 may also store log data. This log data may include, for instance, sensor data generated by a perception system indicating available parking spots, such as the perception systems of vehicles 112, 114, 116. Storage system 140 may further store information associated with the parking spots, such as location, street, size, regulations, etc. This information may be retrieved or otherwise accessed by a server computing device, such as one or more server computing devices 130, in order to perform some or all of the features described herein.

Figure 2:
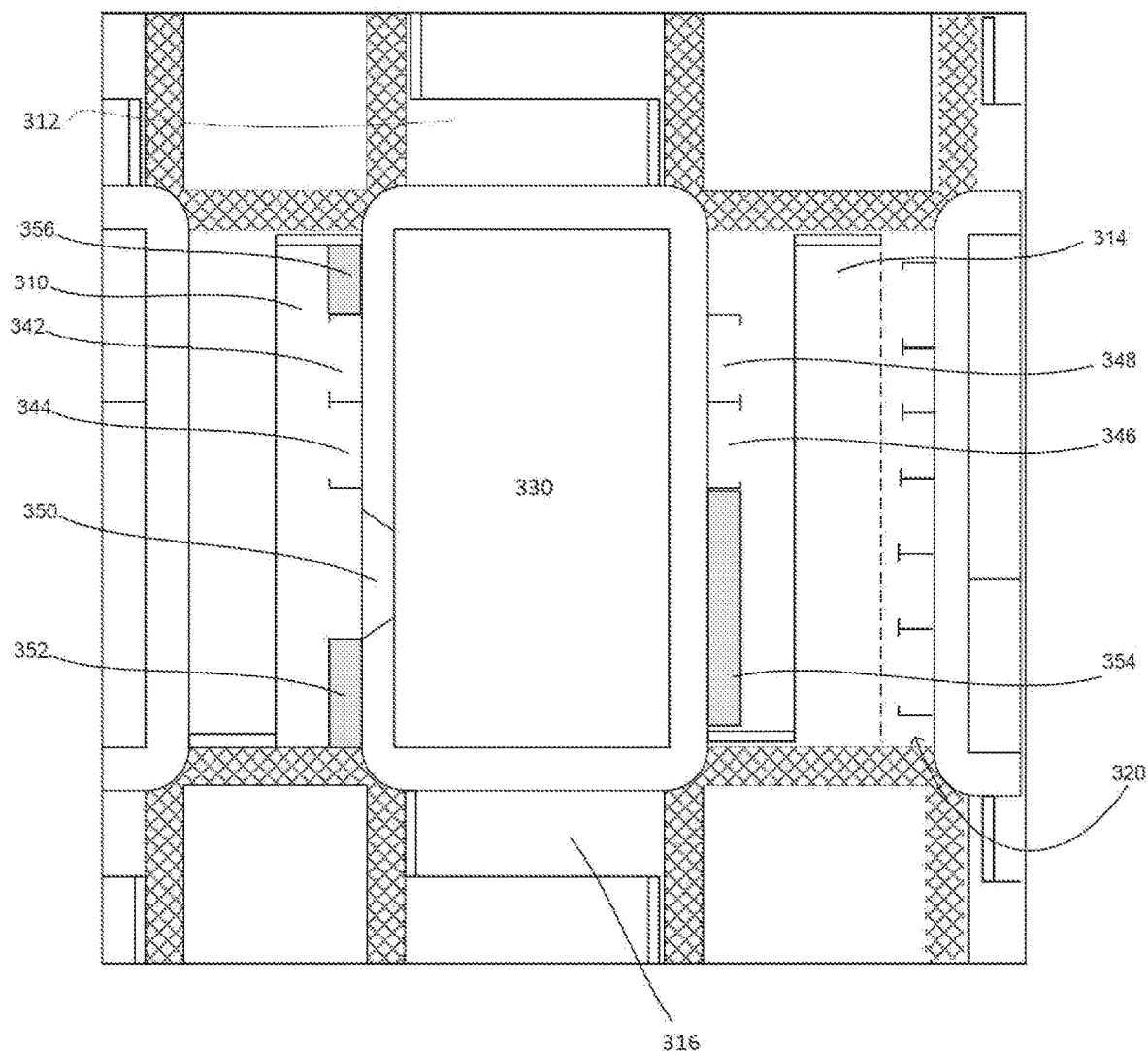
FIG. 2 is a pictorial diagram of a map in accordance with aspects of the disclosure.

FIG. 2 is an example of detailed map data 300 for a city block. In this example, the detailed map data includes a plurality of different features that identify the location of various features such as driving lanes 310, 312, 314, 316, parking lane 320, building 330, on-street parking spots 342, 344, 346, 348, a driveway entrance (for example to a parking garage or other location) 350, and no parking zones 352, 354, 356.

The detailed map data may also include information identifying areas that are predesignated as parking areas. For example, the areas corresponding to on street parking spots 342, 344, 346, 348 or parking spots within parking lane 320 may each be stored in system storage 140 as a predesignated parking area. Some areas may also be predesignated as areas which may be suitable for brief short term stops to wait or drop off a passenger such as the area in front of driveway 350. Similarly, other areas, such as no parking zones 352, 354, 356 may be stored in system storage 140 as a no parking zone. This pre-designation may be performed manually by human review, automatically based on the characteristics of areas (for example, whether there are parking lines defining a parking space or diagonal lines representing a no parking zone, whether an area is sufficiently large for a vehicle of a particular size), machine learning, or a combination of these.

The map data 300 may be used when computing a route. For example, knowing driving lane 314 has an adjacent parking lane 320 may increase the probability of finding an available parking spot on a route including driving lane 314. In some instances, the system may use the map data 300 to calculate turn costs by considering whether there is a stop light or stop sign at an intersection. The map data 300 may be displayed on an interface of the client computing device.

Figure 3:
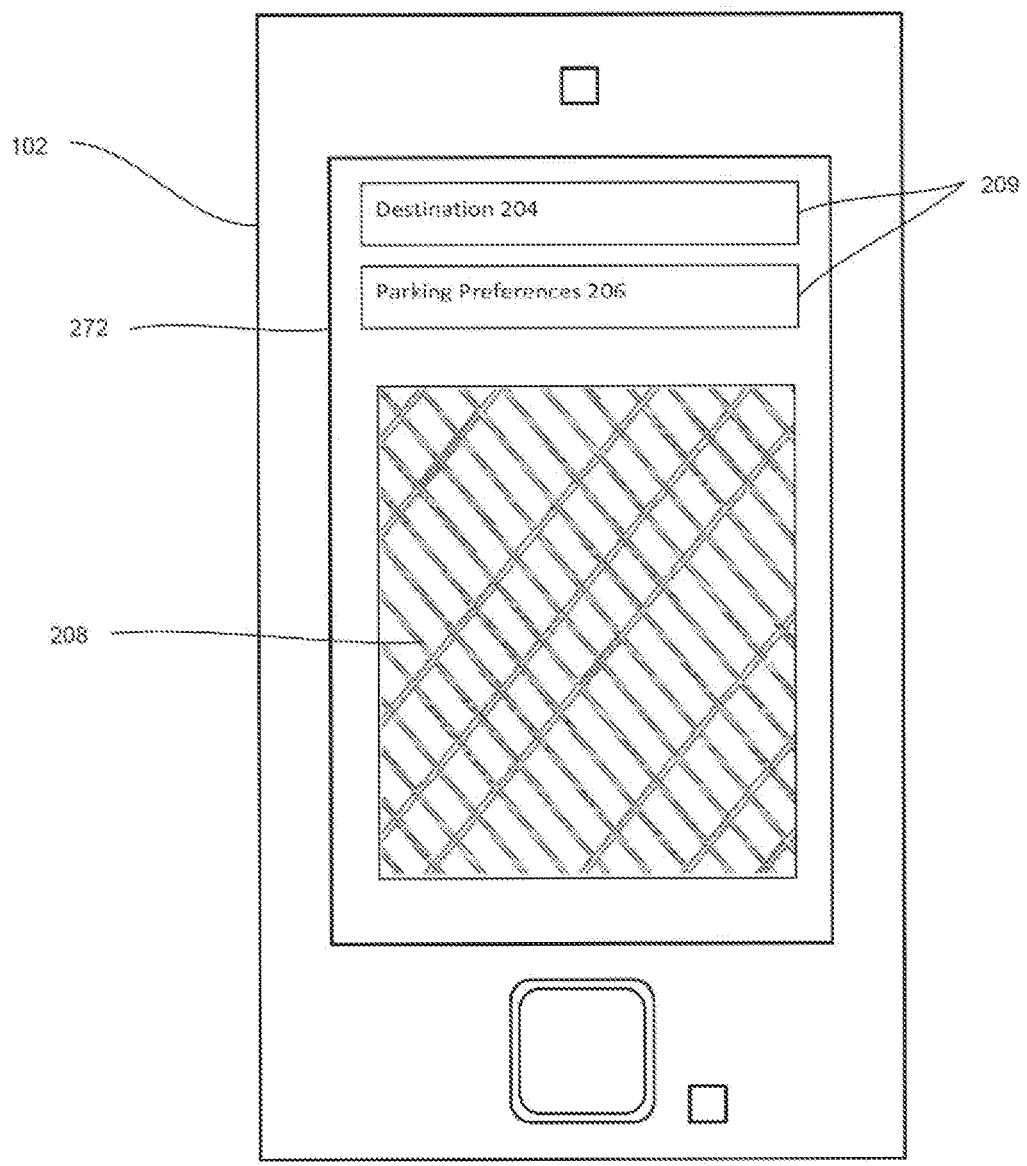
FIG. 3 illustrates an example interface in accordance with aspects of the disclosure.

FIG. 3 is an example interface on the client computing device 102 for user interaction with the system 100 that may be stored in storage system 140. For example, display 272 may show one or more input fields 209 and map 208. The input fields 209 may be, for example, drop down menus, radio buttons, free text, etc. Input fields 209 may be used to indicate, by way of example only, destination 204, parking preferences 206, or other parameters. For example, a user may input a desired destination 204, such as an address, business name, landmark, geographic coordinates, etc. The map 208 may, in response to a selected destination, display the selected destination. In other examples, the user may point to a spot on the map 208 to indicate the desired destination, and the destination field 204 may be updated accordingly. The user may further input parking preferences 206, such as a maximum distance from the desired destination, an expected duration of parking, a preference for free or paid parking, or any of a variety of other preferences.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
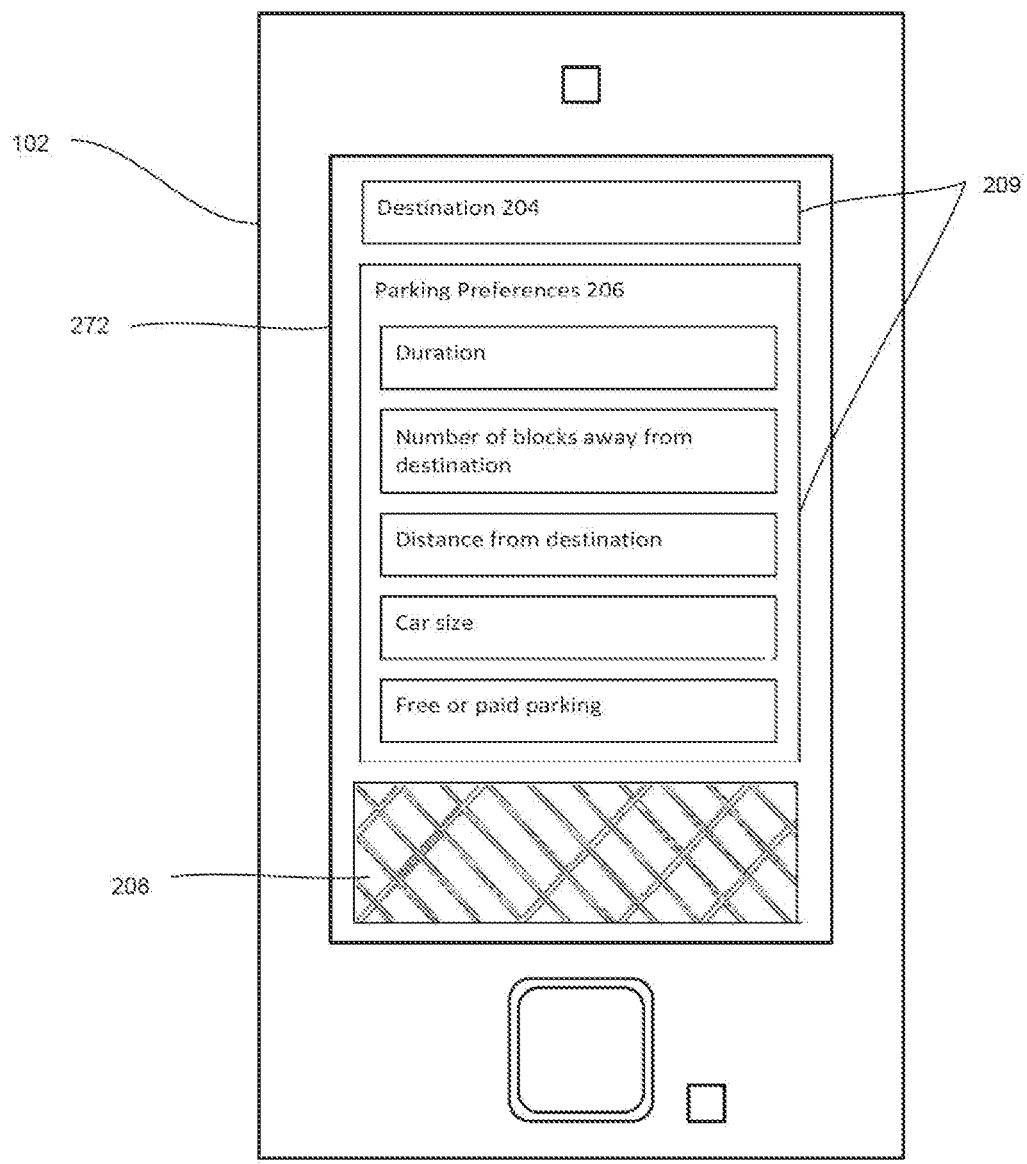
FIG. 4 illustrates another example display on a computing device in accordance with aspects of the disclosure.

Referring now to FIG. 4, computing device 102 is being shown as being used in conjunction with system 100. The system may receive a request for directions to an open parking spot within a particular geographical area. For example, a user may enter information into input fields 209. The user may enter, for example, an intended destination 212 into the destination field 204. The user may also input parking preferences, such as duration, the number of blocks away from the destination, the distance from the destination, the car size, free or paid parking, etc., into the preferences field 206. The number of blocks away from the destination may, for example, set a maximum distance, measured in blocks, away from the final destination that a user may park. For example, as shown in FIG. 5A, a distance from the destination 212 may be, which may create a maximum radius from the final or intended destination 212 that a user may wish to park. For example, the distance may be a half-mile (½ mile). Thus, the system may create a search area 210 around destination 212 that has a radius of half-mile. The system may search for, find, and/or display a navigational route that maximizes the overall probability of finding an open parking spot while minimizing the amount of time to find a parking spot within that half-mile radius surrounding destination 212.

Figure 5B:
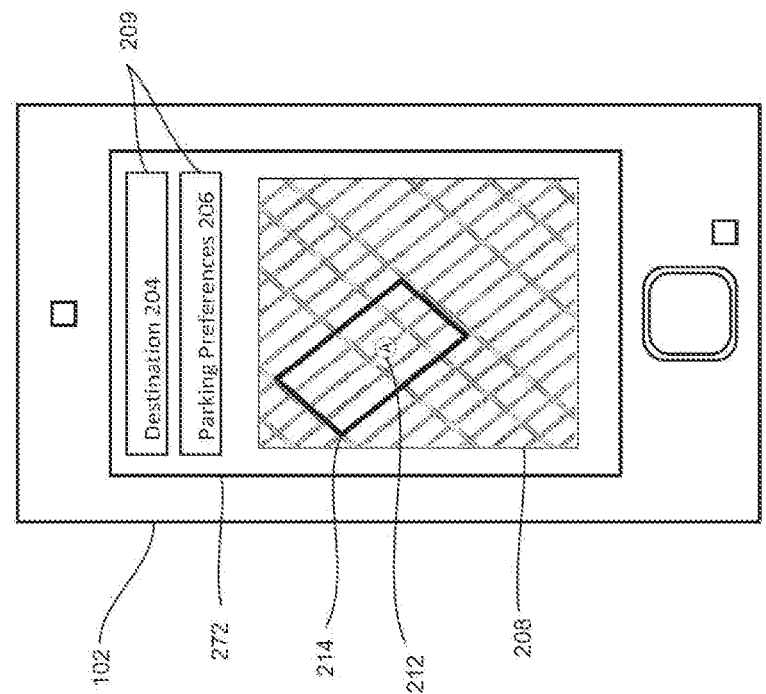
FIGS. 5A and 5B are example displays of a selected geographical area in accordance with aspects of the disclosure.
Figure 5A:
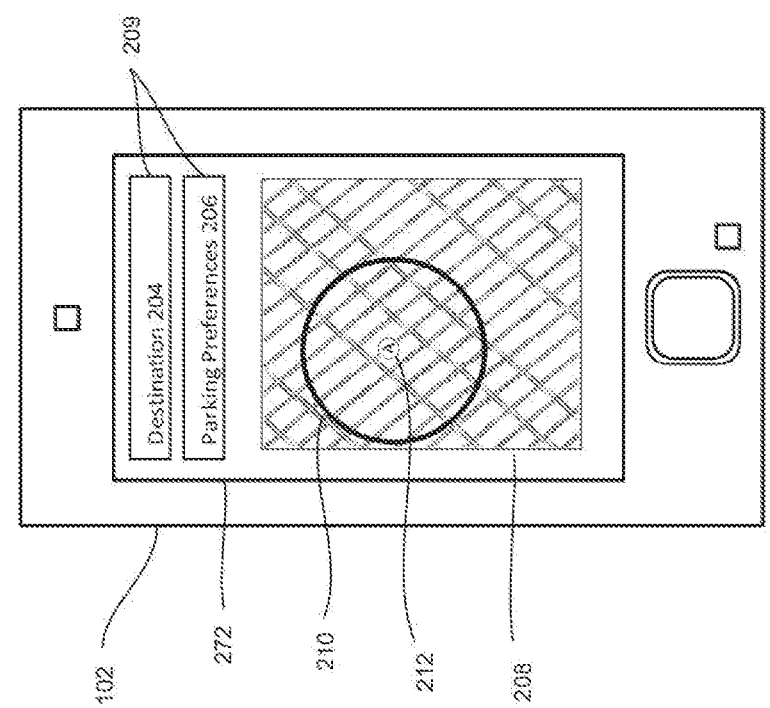

Alternatively, as shown in FIG. 5B, a number of blocks away from destination 212 may be set. For example, the number of blocks away from the destination 212 may be set to two (2) blocks. The system may create a search area 214 around destination 212. The system may search for, find, and/or display a navigational route that maximizes the overall probability of finding an open parking spot while minimizing the amount of time to find a parking spot within that two (2) block radius surrounding destination 212.

A parking duration, for example, may ensure compliance with parking restrictions and regulations. For example, if parking overnight, by selecting the appropriate duration for parking, the system may provide a route to a likely available parking spot that allows for overnight parking. In some examples, the system filters out candidate parking spots that do not allow for overnight parking. In another example, parking may only be necessary for five (5) hours. The system may remove from the list of potential routes a route that would lead the user to a location for two (2) hour parking.

In some instances, parking spaces may be designated for compact cars. If input to the parking preference field 206 specifies a larger vehicle, such as a full-size pickup truck, routes to designated compact spaces may be omitted by the system. Thus, the system may not provide a route that is designated for a compact car or a motorcycle as a larger vehicle will not fit. In other instances, a user may prefer to only park where it is free, instead of paid. By selecting whether free or paid parking is preferred under parking preferences 206, the system may remove from the results a route that would lead the user to an open spot in which they would have to pay for parking.

Figure 6B:
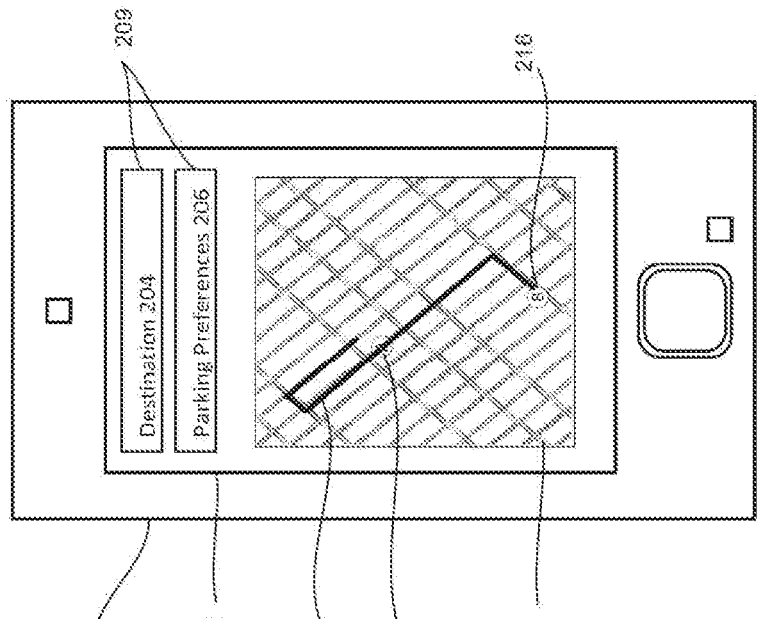
FIGS. 6A and 6B are example displays of routes in accordance with aspects of the disclosure.
Figure 6A:
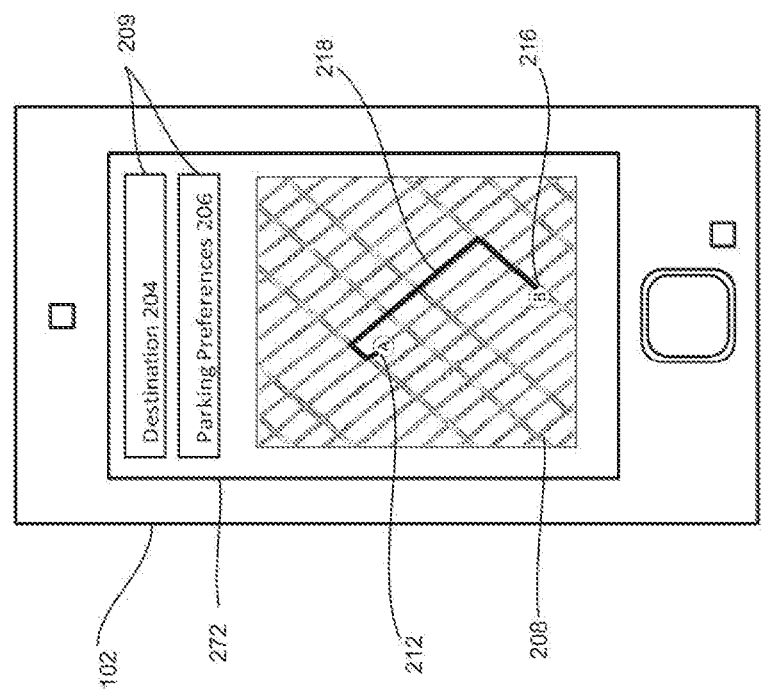

FIGS. 6A and 6B illustrate potential routes to likely parking spaces computed by the system. Route 218, as shown in FIG. 6A, may be a shorter distance of traveling as compared to route 220, as shown in FIG. 6B. However, route 218 may include three (3) left turns between current location 216 and destination 212. Alternatively, route 220 may include one (1) left turn and two (2) right turns. The system may have data that indicates left turns have a higher turn cost than right turns. Turn costs may include, for example, the time it takes to make a turn. In some instances, when considering turn costs, amongst any of the other factors, route 218 may not have the maximum efficiency, for example in any of the way mentioned above, for reaching destination 212 as compared to route 220. Thus, the system may suggest route 220 because it has lower turn costs.

For example, the system may take into account real-time information, such as traffic patterns, speed limits, traffic lights, etc. In some instances, the system may consider the current traffic between the starting destination 216 and the intended destination 212. The system may consider historical data pertaining to traffic. For example, the system may have historical data indicating that between the hours of 4:00 pm and 6:00 pm, certain roads have heavy or stand-still traffic. In some instances, the system may consider that some roads have more traffic lights or stop signs than others. The system may consider the time it may take to go through the traffic light or stop sign. According to some examples, the system may suggest route 218 because it does not go directly past destination 212, which is known to have increased traffic nearby.

The system may consider whether other users are using the system concurrently to find an open spot in the same geographical area. The geographical area may be defined by a distance 210 or number of blocks 214 stemming from the user's ultimate destination 216. Thus, when more than one user is looking for on-street parking at or near the same intended destination 212 during the same time period, the system may provide a different route for each user such that the multiple users are not directed to the same street where there is likely to be open parking spots. In some instances, the system may suggest route 218 to a first user and route 220 to a second user, such that the first and second users are directed to the same likely available parking spot.

In another example, if person "A" wishes to park near the "coffee shop" and is scheduled to arrive around 8:30 am and person "B" also wishes to park near the coffee shop and is also scheduled to arrive around 8:30 am, the system may direct person A to one side street to find parking and person B to a second side street to find parking. Thus, the system may provide an efficient route to both persons A and B, with different end destinations, such that they find parking at or near the same location around the same time using the same application, without persons A and B attempting to obtain the same parking spot. This may avoid at least one of the two persons and their associated vehicle spending additional time driving around the road network searching for a parking spot, having been unable to park in the initial spot. These examples may be particularly effective at reducing congestion and/or air pollution on the local road network, in addition to providing efficient parking routes for the two vehicles individually.

In some instances, when determining potential routes 218, 220, the system may take into account historical parking availability. For example, the system may include a database that stores historical parking availability. Historical parking availability may include, for example, information about what time spots have been typically been known to be available on specific days. According to one example, a spot may historically be available between 10:00 am and 10:15 am Monday-Thursday in front of a coffee shop but on Friday-Sunday that same spot is typically not available during that same time slot.

Further, the system may receive information collected by sensors on vehicles driving. For example, vehicles 112, 114, 116 may include a perception system or sensors on their exterior that are able to detect whether a parking spot 342, 344, 348, 348 is occupied or if it is available. The sensors may include ultrasonic sensors, infrared sensors, electromagnetic sensors, cameras, or any of a variety of other types of sensors. The information collected by the sensors may, for example, be transmitted to server computing devices 130 at a central location. The server computing 130 may then process the information and update the system in real time. As one example, the system may determine that a user looking for a parking space drove down a street having a spot indicated by the sensors to be available, but the user did not park in the identified spot. In this example, the system may infer that the identified spot is no longer available, such as if another vehicle parked in the spot in the interim. Thus, the system may use the most up-to-date status information pertaining to the availability of on-street parking. In some instances, the system may update on a schedule. For example, the system may be updated nightly to receive the information collected by the sensors. This information may, for example, be stored in the memory of the system as information related to historical parking availability.

In another example, the system may receive information by users 122, 124, 126 currently using the system. For example, if user 122 drives down a first street with the intention of parking but does not park, the system may re-route or redirect user 124 to a second street, different from the first, if user 124 was also looking for parking in that same geographical area. Thus, the system may recognize and update in real time that there was no parking on that first street.

In yet another example, when determining potential routes 218, 220, the system may take into account the time it will take to execute that route due to, for example, traffic or the time it takes to make turns. Therefore, each route 218, 220, when taking into account the time it takes to execute, may have a different probability that the user 122, 124, 126 will find an open parking spot. The system may also take into account information pertaining to whether a particular street has a parking lane 320 and/or relevant parking restrictions that would hinder a user's ability to park in that location. For example, by knowing whether or not a street has a parking lane 320, the system may automatically include or exclude that street when determining potential routes. Further, by including details about the user's parking requirements, such as whether they wish to park overnight, the system will be able to include or exclude spots based on the requirements.

Each potential route 218, 220 may be assigned a score, based on one or more of the factors listed above. For example, the score may be based on efficiency, including turn costs and traffic, as well as the probability of a likely available spot. The turn costs may, for example, account for a first proportion of the total score, such as a maximum turn cost score of twenty-five percent (25%) of the total score. Thus, for a country or state in which vehicles drive on the right-hand side of the road, if there are more left turns, i.e. turns which require the vehicle to turn across oncoming traffic, the percentage of the score for turn costs may decrease. For example, route 218 has three (3) left turns; the score for turn costs of route 218 may be twelve percent (12%), i.e. 12/25. Route 220, for example, only has one (1) left turn; the score for turn costs of route 220 may be higher at e.g. twenty percent (20%), i.e. 20/25. Traffic, both in real-time and historic, may, for example, account for a second proportion of the total score, such as a maximum traffic score of fifty percent (50%) of the total score. Thus, in instances where there is more traffic, in real time and/or based on historic information, the percentage of the score for traffic may decrease. For example, route 220 drives past destination 212, which may have historically increased traffic; the traffic score for route 220 may be thirty percent (30%), i.e. 30/50. Route 218 may have less traffic in real time and historically; the traffic score for route 220 may be higher at e.g. forty percent (40%), i.e. 40/50. The probability of a likely available parking spot may, for example, account for a third proportion of the total score. This may be the remainder of the available maximum score, such as a maximum 'likely availability' score of twenty-five percent (25%) of the total score. The probability of a likely available parking spot may be based on both historical parking information and real-time information that may be received from the system and/or perception systems. Thus, in instances where probability of a likely available parking spot is low, the percentage of the score for likely available parking may decrease. For example, route 218 may only consist of roads with on-street parking spots, and no parking lanes; the score for likely available parking for route 218 may be fifteen percent (15%), i.e. 15/25. Route 220 may include roads with both on-street parking spots and parking lanes; the score for likely available parking for route 220 may be higher at e.g. twenty-two percent (22%), i.e. 22/25. The above is just an example and it should be understood that alternative computations are possible. Moreover, more or less factors may be included in assigning a score to a route.

The route 218, 220 with the best, or highest, score may be sent to the user 122, 124, 126. Finding a spot becomes even more efficient as more factors are included when calculating a route 218, 220 for the user 122, 124, 126 to follow in their vehicle. Moreover, this system may be used not only for finding street parking but it may also be used for finding parking in a parking lot or a parking garage using the same factors.

Figure 7:
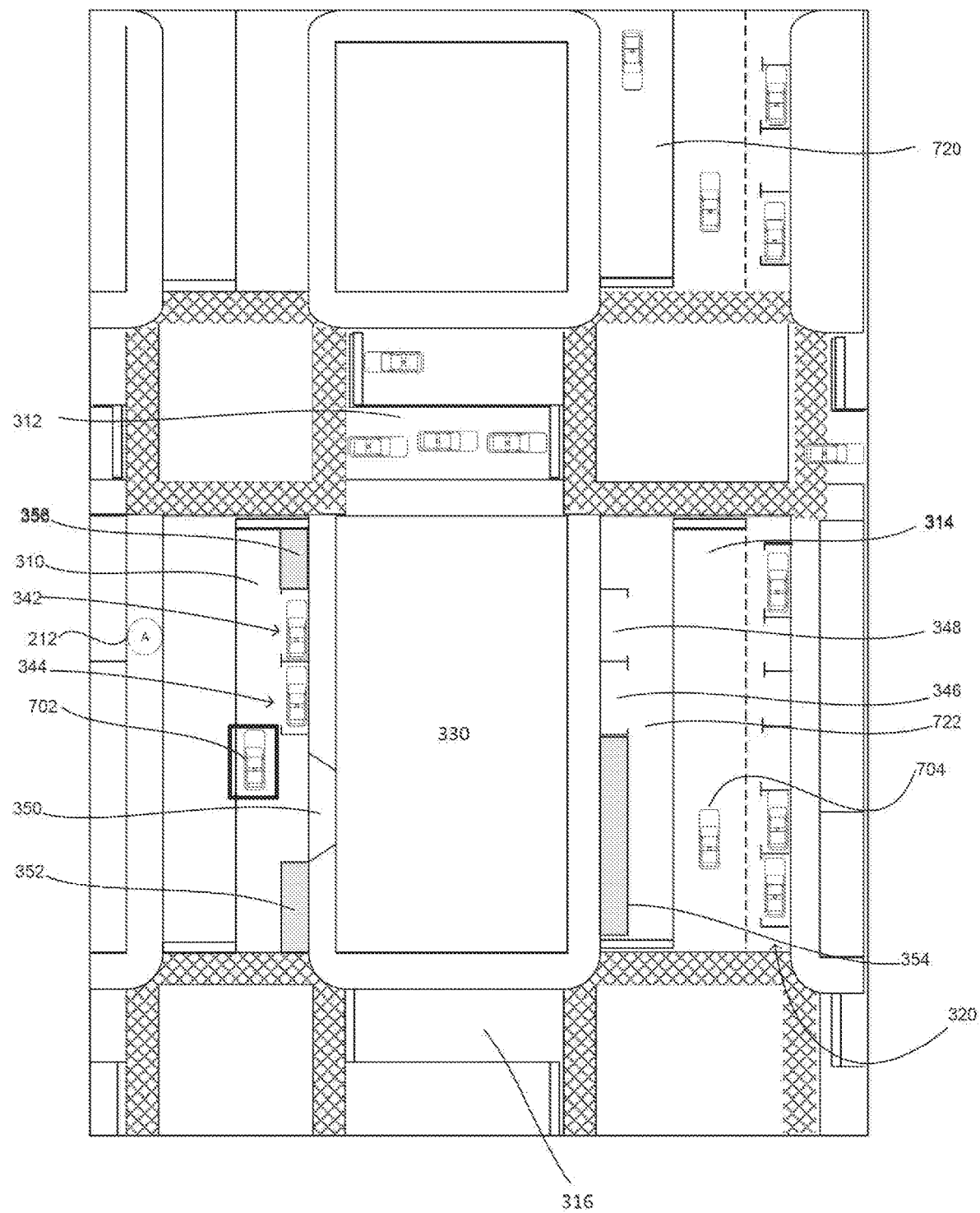
FIG. 7 is a pictorial diagram of a map in real time in accordance with aspects of the disclosure.

FIGS. 7-10 illustrate one example of a user using the system to maximize the probability of finding an open parking spot within a certain radius 210 or number of blocks 214 away from destination 212. Referring to FIG. 7, vehicle 702 may be routed to driving lane 310 as there is known on street parking, parking spots 342, 344. However, system 100 may recognize that vehicle 702 did not park in either spot. Thus, system 100 may update, in real-time, to provide an alternative route for vehicle 702 to find parking within radius 210 or number of blocks 214 away from destination 212.

The system 100 may, when calculating an alternative route, receive information from vehicle 704. For example, vehicle 704 may be driving in driving lane 314. Vehicle 704 may have a perception system or sensors that detect that parking spots 346, 348 are currently available. Upon receiving this information, system 100 may calculate a route that directs vehicle 702 to those likely available spots.

Figure 8A:
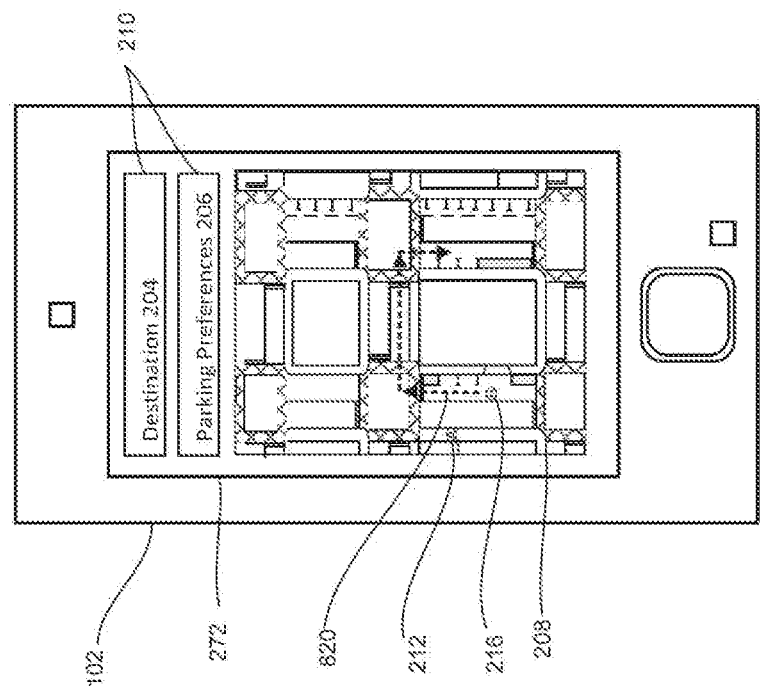
FIGS. 8A and 8B are example displays of updated routes in accordance with aspects of the disclosure.
Figure 8B:
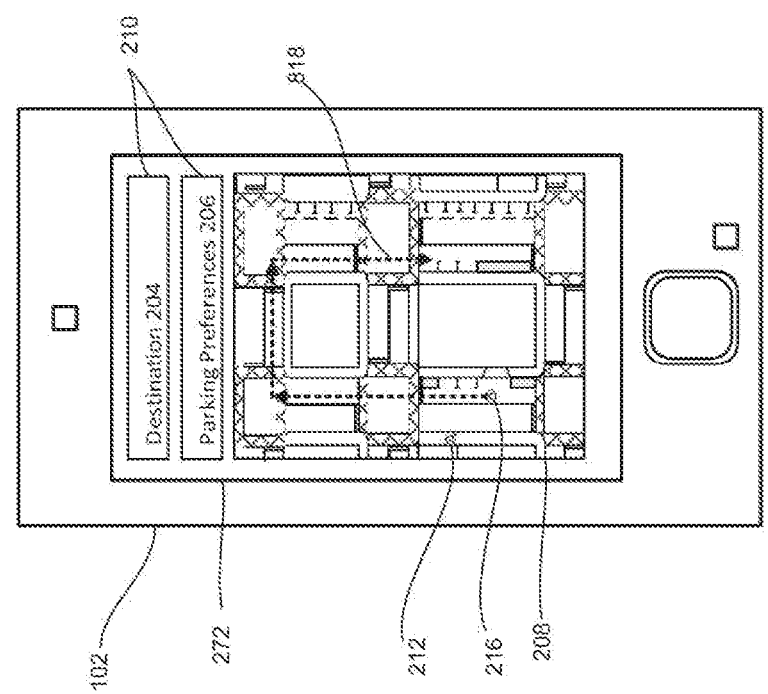

FIGS. 8A and 8B illustrate new potential routes 818, 820 that may be calculated by system 100. The system 100 may take into account traffic and turn costs when computing a potential route. Thus, system 100 may recognize that there are three (3) cars currently stopped in driving lane 312. System 100 may, in some instances, determine that route 820 may not be as efficient as route 818 due to traffic and turn costs. System 100 may provide route 818 to the user within vehicle 702 as being the most efficient route that also provides the maximum possibility of finding an open parking spot.

Figure 9:
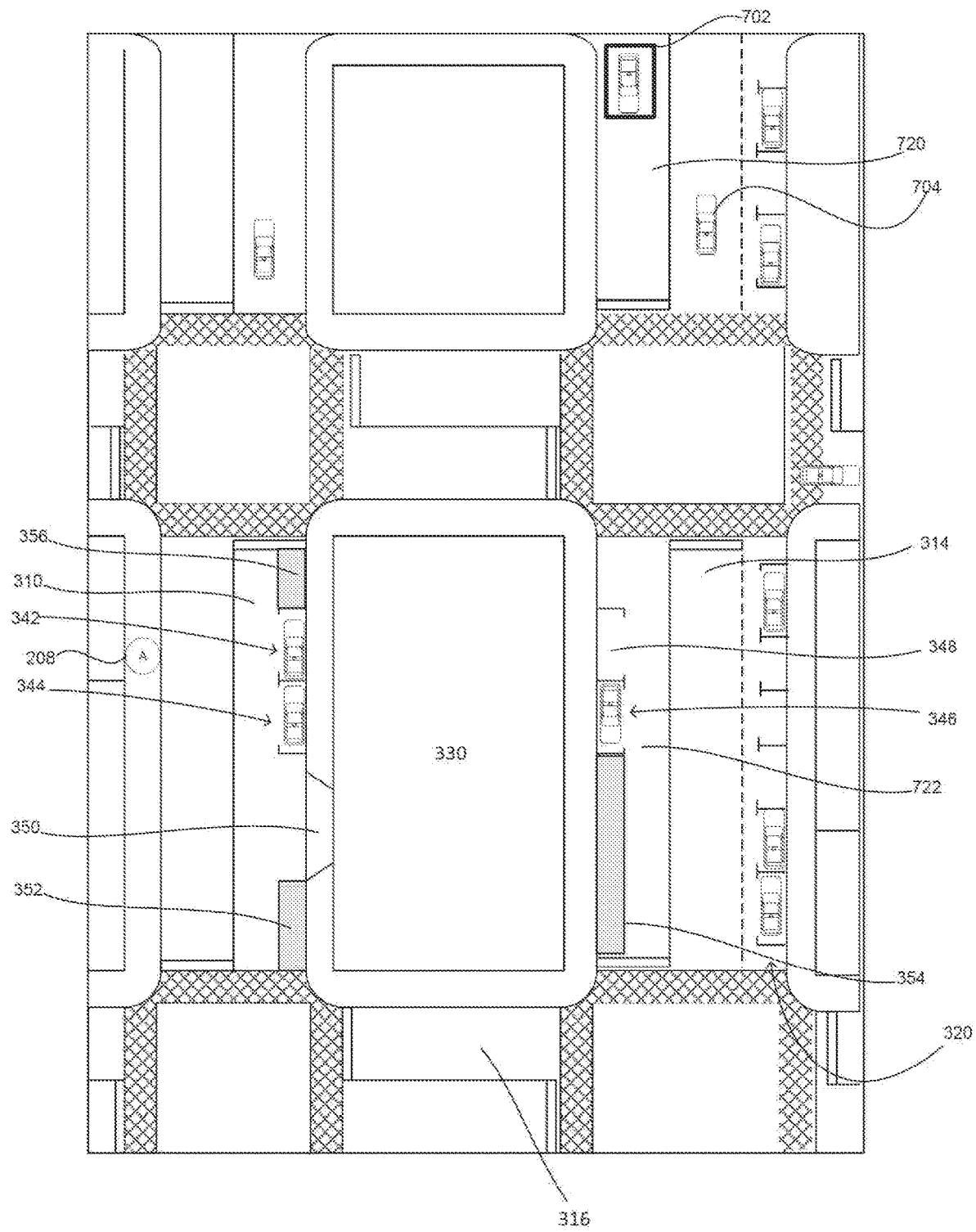
FIG. 9 is another pictorial diagram of a map in real time in accordance with aspects of the disclosure.
Figure 10:
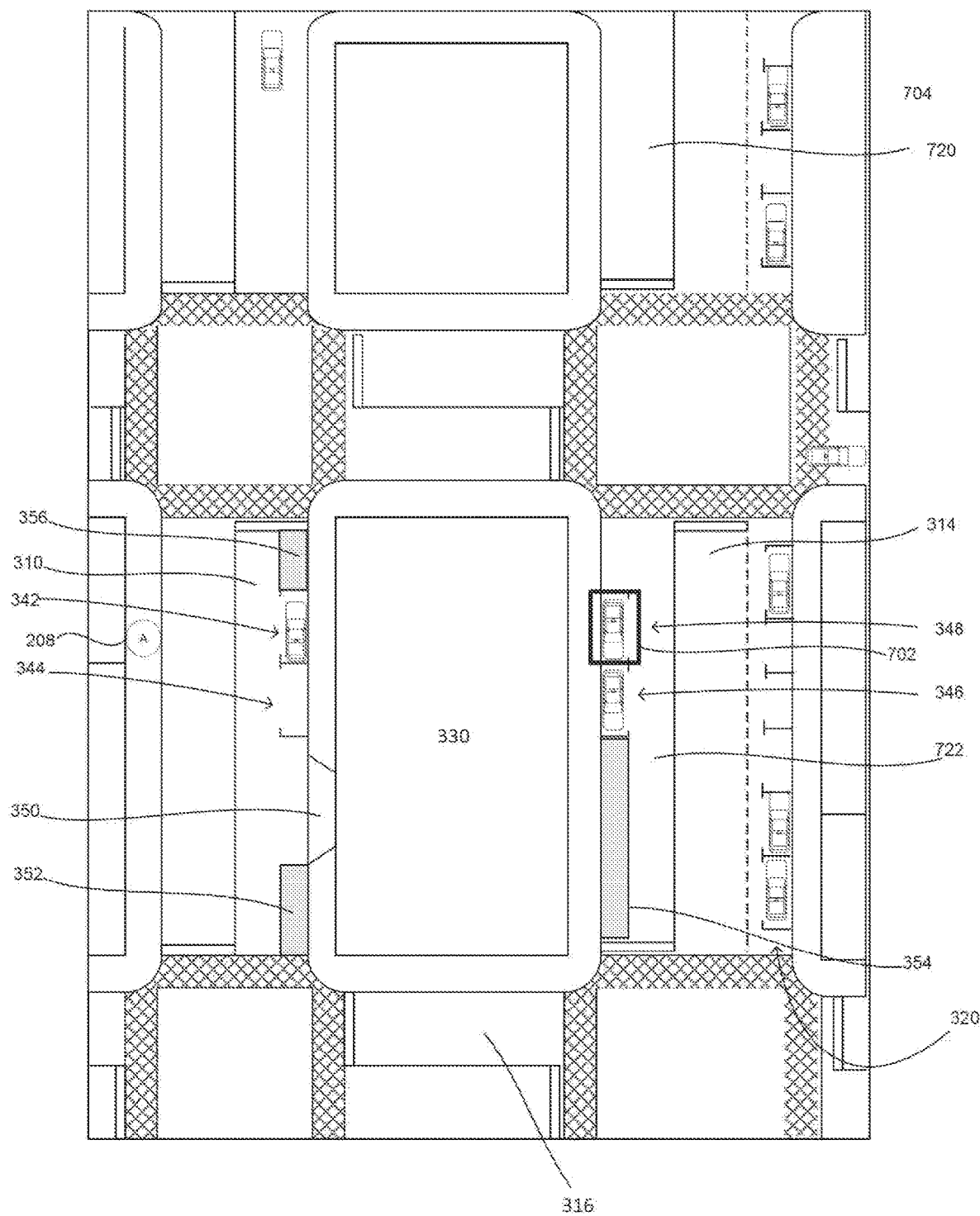
FIG. 10 is another pictorial diagram of a map in real time in accordance with aspects of the disclosure.

Vehicle 702 may then follow route 818, as seen in FIGS. 9-10. Referring to FIG. 9, vehicle 702 may drive in driving lane 720. A different vehicle may park in parking spot 346, one of the parking spots that vehicle 702 was directed to. Vehicle 702 may continue to travel in driving lane 722 and may park in parking spot 348, as shown in FIG. 10.

In some instances, not shown, if vehicle 702 did park in parking spot 348, system 100 may receive that information and update, in real-time, to provide another route to maximize the efficiency of the user of vehicle 702 in finding a likely available parking spot. For example, maximizing the efficiency of the user may include finding a most efficient route. A most efficient route, for example, may be a route that takes the shortest amount of time to reach the destination and/or available parking. In some instances, the most efficient route may be the route that has the shortest distance between the starting location and the intended destination. The most efficient route may, for example, include the time it may take to find a parking spot. The most efficient route may be a combination of elements, such as those listed above, or others.

Figure 11:
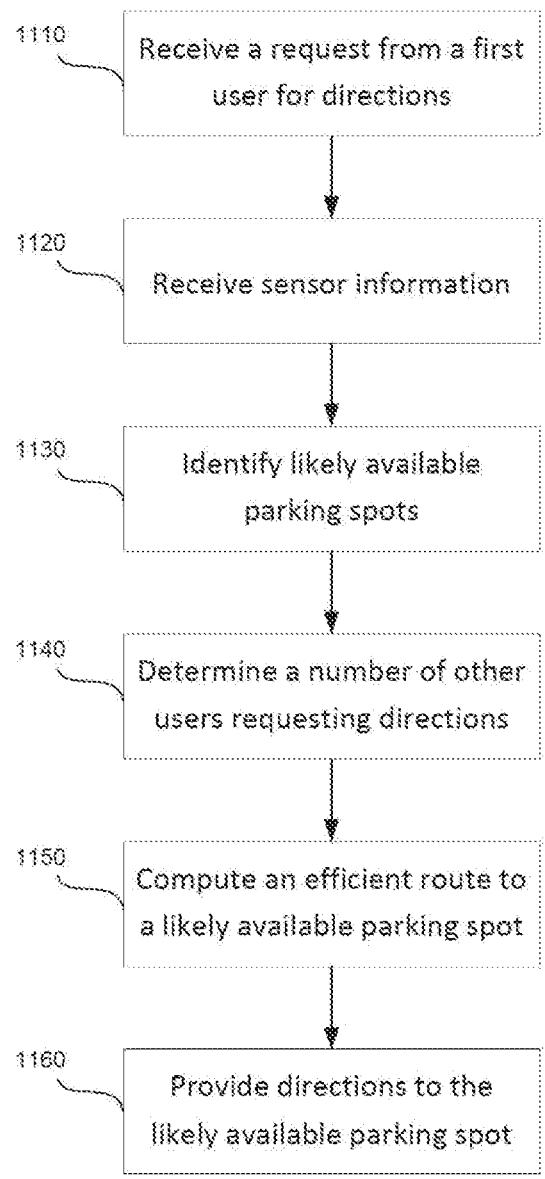
FIG. 11 is a flow diagram in accordance with aspects of the disclosure.

FIG. 11 illustrates a sequence of steps that may occur within system 1100. For example, in block 1110 the system may receive a request form a first user for direction to an intended location. The system may receive information regarding the user's parking preferences. For example, such input may include a maximum distance away from the intended destination that they are willing to park, whether they want free parking or paid parking, the intended duration of parking, etc. Parking preferences may also be received, such as before, simultaneously, or after receiving the request for directions. For example, a request for directions may be received by receiving an input with an intended destination and then parking preferences. Alternatively, the system may receive an input including parking preferences and save those preferences as preset preferences. Thus, the system may only receive an input for the intended destination. In yet another example, the system may receive and input the intended destination and the parking preferences at the same time.

The system, in block 1120, may then receive sensor information. Vehicles driving on the road may include sensors and/or a perception system that collects information pertaining to the availability of spots. As a vehicle with sensors drives, the sensors may collect information pertaining to the available of parking spots. For example, the sensors may detect whether a parking spot is taken or is available. The information collected by the sensors may be sent to the server computing devices to update the system. Thus, the system may, in real-time, know what spots are available and what spots are unavailable to use in calculating an efficient route having the highest probability of finding an available parking spot. The system may also receive information from other users utilizing the system. For example, if second user is also searching for parking within the same geographical area but does not park on a certain street, the system may receive that information. The system may determine that it would not be efficient to send the first user down that same street the second user just drove down as there is not a high probability of finding parking.

In block 1130 the system may identify likely available parking spots. The system may utilize the received sensor information when identifying likely available parking spots. The system may use, at the same time or in the alternative, historical parking information, information received from other users currently utilizing the system, various parking restrictions, etc.

Once the system identifies likely available parking spots, in block 1140, the system may determine a number of other users requesting directions. For example, the system may determine how many users are searching for parking in the same radius or number of blocks. In some instances, the system may utilize this information in calculating a route such that each user is sent a different route or directed to a different street in order to have the highest probability of each user finding street parking.

The system may, in block 1150, compute an efficient route to a likely available parking spot. The system may compute an efficient route based on at least the identified likely available parking spots and the number of other users within the particular geographical area that have also requested directions to open parking spots. For example, each potential route may be assigned a score based on any number of factors chosen by the system and/or the user. The route with the best score, for example, the route with the maximum efficiency and highest probability of finding a likely open parking spot may then be provided to the user. For example, in block 1160, the system may provide directions to the likely available parking spot.

The system may be capable of reducing the amount of fuel/alternative propulsion power used by the vehicle during parking. For example, by computing a more efficient route with a higher probability of finding a likely available parking spot, less driving may be necessary. Less driving may reduce the amount of fuel and/or alternative propulsion power used by the vehicle in driving to the destination and finding a parking spot. It may also reduce air pollution caused by the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   a memory;
   one or more processors coupled to the memory, the one or more processors being configured to:
   receive a request for directions to an open parking spot for a first vehicle within a particular geographical area;
   receive sensor information detected from one or more sensors, the sensor information indicating potential open parking spots;
   identify, based on the received sensor information, one or more likely available parking spots;
   receive information pertaining to turn costs, wherein the turn costs are defined by a time required for a vehicle to make a turn, the time including a period of time to travel through a stop light or stop sign at an intersection;
   compute, based on at least the identified likely available parking spots and the information pertaining to turn costs, a route to one of the identified likely available parking spots; and
   provide directions for the first vehicle to the one of the identified likely available parking spots.

2. The system of claim 1, wherein the particular geographical area is defined by a radius from a destination specified by the first vehicle.

3. The system of claim 1, wherein the one or more processors are further configured to receive information pertaining to current traffic.

4. The system of claim 3, computing the route to one of the identified likely available parking spots is further based on the information pertaining to current traffic.

5. The system of claim 1, wherein the one or more processors are further configured to receive information pertaining to at least one of (i) historical parking availability, (ii) whether a street has parking lane, or (iii) parking restrictions.

6. The system of claim 1, wherein the route is a most efficient route based on at least one of (i) a distance to a destination, (ii) a computed time to the destination, or (iii) a time to find one of the identified likely available spots.

7. The system of claim 1, wherein the one or more processors are further configured to compute, based on at least the identified likely available parking spots and the information regarding other vehicles, a second route to a second one of the identified likely available parking spots for a second vehicle within the particular geographical area, the second open parking spot for the second vehicle being different than the first open parking spot for the first vehicle.

8. The system of claim 1, wherein the one or more processors are further configured to automatically update an availability of the identified one or more likely available parking spots based on behavior of the first vehicle or the other vehicles.

9. The system of claim 8, wherein the behavior of the first vehicle or the other vehicles comprises driving past the one or more likely available parking spots without parking.

10. A method, comprising:
  receiving, by one or more processors, a request for directions to an open parking spot for a first vehicle within a particular geographical area;
  receiving, by the one or more processors, sensor information detected from one or more sensors, the sensor information indicating potential open parking spots;
  identifying, by the one or more processors and based on the received sensor information, one or more likely available parking spots;
  receiving, by the one or more processors, information pertaining to turn costs, wherein the turn costs are defined by a time required for a vehicle to make a turn, the time including a period of time to travel through a stop light or stop sign at an intersection;
  computing, by the one or more processors and based on at least the identified likely available parking spots and the information pertaining to turn costs, a route to one of the identified likely available parking spots; and
  providing, by the one or more processors, directions to the first vehicle to the one of the identified likely available parking spots.

11. The method of claim 10, wherein the particular geographical area is defined by a radius from a destination specified by the first vehicle.

12. The method of claim 10, further comprising receiving, by the one or more processors, information pertaining to current traffic.

13. The method of claim 10, further comprising receiving, by the one or more processors, information pertaining to at least one of (i) historical parking availability, (ii) whether a street has parking lane, or (iii) parking restriction.

14. The method of claim 10, wherein the route is a most efficient route based on at least one of (i) a distance to a destination, (ii) a computed time to the destination, or (iii) a time to find one of the identified likely available spots.

15. The method of claim 10, further comprising computing, by the one or more processors, based on at least the identified likely available parking spots and the information regarding other vehicles, a second most efficient route to a second one of the identified likely available parking spots for a second vehicle within the particular geographical area, the second open parking spot for the second vehicle being different than the first open parking spot for the first vehicle.

16. The method of claim 10, further comprising automatically updating, by the one or more processors, an availability of the identified one or more likely available parking spots based on behavior of the first vehicle or the other vehicles.

17. The method of claim 16, wherein the behavior of the first vehicle or the other vehicles comprises driving past the one or more likely available parking spots without parking.

18. A non-transitory computer readable storage medium storing instructions executable by a processor for performing a method comprising:
  receiving a request for directions to an open parking spot for a first vehicle within a particular geographical area;
  receiving sensor information detected from one or more sensors, the sensor information indicating potential open parking spots;
  identifying, and based on the received sensor information, one or more likely available parking spots;
  receiving information pertaining to turn costs, wherein the turn costs are defined by a time required for a vehicle to make a turn, the time including a period of time to travel through a stop light or stop sign at an intersection;
  computing, based on at least the identified likely available parking spots and the information pertaining to turn costs a route to one of the identified likely available parking spots; and
  providing directions to the first vehicle to the one of the identified likely available parking spots.

19. The non-transitory computer readable storage medium of claim 18, the method further comprising computing, by the one or more processors, based on at least the identified likely available parking spots and the information regarding other vehicles, a second most efficient route to a second one of the identified likely available parking spots for a second vehicle within the particular geographical area, the second open parking spot for the second vehicle being different than the first open parking spot for the first vehicle.

20. The non-transitory computer readable storage medium of claim 18, the method further comprising updating automatically, by the one or more processors, an availability of the identified one or more likely available parking spots based on behavior of the first vehicle or the other vehicles.

* * * * *